United States Patent [19]

Smith et al.

[11] 3,774,683

[45] Nov. 27, 1973

[54] METHOD FOR STABILIZING BORE HOLES
[75] Inventors: Dwight K. Smith, Duncan, Okla.;
Carl A. Lane, Las Vegas, Nev.
[73] Assignee: Halliburton Company, Duncan, Okla.
[22] Filed: May 23, 1972
[21] Appl. No.: 256,023

[52] U.S. Cl.................. 166/293, 61/36 R, 61/41 R
[51] Int. Cl...................... E21b 33/138, E21d 5/00
[58] Field of Search................... 166/285, 292, 293; 61/40, 41 R, 36 R

[56] References Cited
UNITED STATES PATENTS

| | | | |
|---|---|---|---|
| 2,990,016 | 6/1961 | Goins, Jr. et al. | 166/293 |
| 2,079,517 | 5/1937 | McQuiston | 166/293 |
| 3,044,547 | 7/1962 | Jarboe, Jr. | 166/293 X |
| 2,708,973 | 5/1955 | Twining | 166/293 X |
| 3,636,714 | 1/1972 | Korol et al. | 61/36 R |
| 3,363,689 | 1/1968 | Smith et al. | 166/293 X |
| 1,716,925 | 6/1929 | Loomis | 166/293 |
| 2,398,347 | 4/1946 | Anderson | 166/293 X |

*Primary Examiner*—Stephen J. Novosad
*Attorney*—John H. Tregoning et al.

[57] ABSTRACT

Unstable earthen formations, particularly subterranean formations, penetrated by holes are stabilized against cave-in, sloughing, and the like, by introducing into the unstable formation a cement composition comprising a hydraulic cement in admixture with certain short length fibers.

10 Claims, No Drawings

METHOD FOR STABILIZING BORE HOLES

This invention relates to the use of cement to stabilize earthen formations penetrated by holes, such as, bore holes and mine shafts.

This invention further relates to a process for forming a cement sheath on the walls of holes.

This invention still further relates to a process for preventing sloughing and cave-in of holes without the use of casing.

In the art of excavating access holes and shafts, such as in the drilling of oil and gas wells, water wells, air shafts, vents, mine shafts and the like, the hole penetrates certain formations which either contain flowing fluids, such as hydrocarbons, water and mixtures thereof, or are unconsolidated or both. The hole walls within these formations tend to slough and/or cave in; and/or fluid tends to flow into the holes. In either occurrence drilling operations are delayed pending removal of the extraneous matter from the hole and prevention of further cavein and/or flooding.

It is known in the art that formation stabilization, i.e. prevention of cavein, flooding, and fluid loss, can be effected by installing a solid barrier, such as a casing, between the formation to be stabilized and the open hole. This is accomplished by placing the barrier in the desired location and thereafter filling the space between the formation wall and the barrier with a hydraulic cement slurry. After the cement hardens, drilling operations can resume. This method of stabilization requires the time and expense of buying and setting casing. In addition, the reduction of hole size, which can be a disadvantage, is also inherently involved in this method of stabilization.

It is also known in the art that formation stabilization can be effected — with marginal success — by placing neat cement in the formation to be stabilized. By this technique a neat cement plug is placed in the hole bore and adjacent cavities. The plug is then drilled out of the hole with the expectation that the cement in the cavity will remain intact. However, the cement in the cavity usually cannot withstand the drilling activity with the result that it is either partially or totally destroyed. If the neat cement does not fail by the direct action of drilling, then it is well known that removal of the cement support by sloughing of the formation beneath the set cement will also cause the cement to fail. Thus, resort to this method of stabilization usually requires repeated time consuming attempts — occasioned by cement failure as just described — to achieve success. Many times, however, this method just will not achieve success thereby forcing the operator to employ the previously described casing method with its own peculiar problems and disadvantages.

These and other problems are solved by this invention which provides a process for forming a cementitious lining on the wall of the hole to be stabilized wherein the use of the above mentioned barrier, e.g., casing, is eliminated.

The phrase, "lining on the wall of the hole," as used herein means a coating of any given thickness which protrudes from the peripheral formation surface bounding the hole, i.e., the hole "wall," into the hole itself to thereby reduce the cross-sectional area of the hole; the phrase also means a plug which fills a cavity in an earthen formation which is intersected by the hole wherein the plug does not protrude into the hole itself and therefore the cross-sectional area of the hole is not reduced; and the phrase also means a combination of the plug filling a cavity as above defined wherein the plug also protrudes into the hole itself to reduce the cross-sectional area of the hole.

The word "hole" as used herein means an excavation of desired diameter and/or cross-sectional area having a designated boundary surface, but does not mean a cavity contiguous to the hole which may have been, but not necessarily, formed upon destruction of the designated boundary surface by a cave-in, sloughing and the like of the formation penetrated by the hole.

The word "wall" and the phrases "hole wall" and "formation wall" as used herein mean the designated boundary surface, i.e., the peripheral formation surface, between the hole and the formation(s) penetrated by the hole.

The process of this invention is based upon the surprising and unexpected discovery that a substantial segment of a mass of a cured, i.e., hardened, cement composition comprised of at least a hydraulic cement in admixture with certain fibers, can be removed from the hardened mass by excavating methods, involving crushing, grinding, chipping, fracturing and/or similar processes which are directly conducted against the segment to be removed, without shattering, cracking, spalling or otherwise similarly damaging the part of the cured mass which is intended to be left in place. Cured cement compositions not containing fibers cannot sufficiently withstand the above described rigors of drilling to avoid such damage to those portions not directly acted upon by the excavating apparatus. The effect of the fibers upon the drilling properties of cured cement was thus surprising and completely unexpected.

In one preferred aspect of this invention, a substantially vertical hole, such as the bore hole for an oil and/or gas well or a large diameter shaft often penetrates unconsolidated earthen formations with the result that material from the formations caves into the hole thereby binding the bit and considerably enlarging the hole size. These formations can be readily stabilized, and the caved portions of the hole filled without the use of forms, such as casing, and without diminution of hole size by the process of this invention. In one such specific instance a 65-inch diameter hole being drilled with a 64-inch diameter bit experienced serious caving over an interval of about 230 feet. Hole enlargement due to caving in this interval ranged up to about 40 inches and more.

Three separate attempts were made to fill the enlargements with a hydraulic cement slurry not containing fibers. None of these three attempts were totally successful in placing a plug in the enlargements which would withstand the rigors of drilling. In some attempts the hardened cement would seemingly not fracture as a direct result of drilling, but the cement would fracture apparently not being able to support itself as underlying unconsolidated material caved in. In other attempts the cement without fibers apparently failed as a direct result of drilling.

In contrast, a fourth attempt was made using hydraulic cement with fibers; this attempt was made over approximately the last 75 feet of the interval. This cement job did successfully fill the enlargement and drilling then proceeded to completion without difficulty. Slight caving did occur below the above described fourth cement attempt, but the hardened fibrous cement did not fail.

In each of the four above described attempts, the total volume of the interval treated, including the enlargement, was completely filled with cement, allowed to harden, and thereafter, the interval was drilled out using a 64-inch bit.

Regarding the attempt with the fiber-containing cement, the cement composition located within the projected cross sectional area directly contacted by the bit was removed; however, the cement composition within the enlargement was not damaged and no further caving or sloughing in this interval was experienced. Furthermore, the diameter of the hole over the interval subsequent to the placement of the cementitious lining ranged from about 65 inches to about 68 inches wherein less than about 14 feet of the interval had a diameter in excess of about 66 inches. Thus, with only one attempt, formation stabilization was achieved and hole enlargement was prevented without casing and without reduction of hole size.

In more general terms, this invention provides a process for stabilizing earthen formations adjacent to holes and for otherwise forming a cementitious lining on the formation wall without the use of forms.

Thus, according to the process of the invention, the portion of the hole to be lined with cement is first located and then isolated. The total volume of this portion, which can include large sloughed and caved segments, is substantially completely filled with an aqueous slurry of the hereinafter described cement composition to thus form a plug. According to one method the slurry can be placed in the isolated portion by merely introducing a sufficient quantity of the slurry into the portion via an appropriate conduit until the portion is filled.

After the slurry is placed, a sufficient period of time is allowed to pass in order to permit the cement composition to harden into a solid plug. The time required to effect sufficient hardening is ordinarily in the range of about 18 to 24 hours. The solid cement plug thus formed is located within the confines of the designated portion of the hole and within the cavity created by the caving, sloughing, and the like, of the unstable formation.

A segment of the solid plug is then removed by suitable excavating techniques such as by drilling out the plug with a rolling cutter bit. The bit utilized to remove the plug can be of the same diameter used to originally drill the hole. In this manner, the desired diameter of the hole is not reduced as a result of the stabilization procedures. Due to the peculiar properties of the cement, the hardened cement in the cavities adjacent to the hole is not in any way damaged by the drilling operation. The only cement removed is that which is directly contacted by the crushing, grinding, cutting and fracturing action of the excavation procedure. Upon removal of the cement, drilling can continue without interruption as permitted by conditions exterior and unrelated to the stabilization activity.

In the above described excavating procedure the diameter of the original hole and the diameter of the hole drilled through the cement plug will be virtually the same if the diameter of the bit utilized to drill both the original hole and the plug is the same. In this instance, therefore, the "lining on the wall of the hole" is really the hardened cement plug introduced into an enlargement produced by cave-in of the original walls of the hole and, therefore, the desired thickness of hardened cement composition contiguous to the formation wall is defined by the varying distances from the desired location of the wall to the enlargement depths resultant from the cave-in. Of course, in certain instances where hole size reduction is desired then the hardened cement plug can be excavated such that a quantity of the plug protrudes into and fills a portion of the original hole diameter as well as into an enlargement caused by cave-in.

The formation stabilization process of this invention is not dependent upon hole diameter or lining thickness. It is contemplated, however, that hole diameters will be in the range of from the commonly used diameters encountered in the drilling of oil and gas wells up to the very large diameter holes excavated in the construction of mine shafts and the like. Accordingly, hole diameters can range from about 5 inches and smaller up to about 40 feet wherein the most common diameters now known range up to about 120 inches.

Lining thickness can range from as little as 0.25 inches. There is no contemplated upper limit on lining thickness except that imposed by economics. It is preferred, however, that at least a portion of the lining extend into a cavity contiguous to a hole. It is believed that such a cavity provides support to the solid plug in addition to the bond developed between the cement and the formation material.

In addition to the above related advantages, there is provided a formation stabilization process which permits successive drilling stages and treatment stages. For example, a hole which is subject to severe caving can be stabilized as above described. Drilling can thereafter proceed wherein there is experienced caving of the formation, but, due to the unique properties of the cement composition, there is no damage to the previously placed plug; thereafter further cement can be placed in the newly caved portion with assurance that the first placed plug will remain intact and self-supporting. Such a formation stabilization process can be described as a drill — stabilize, drill — stabilize, process.

The cement composition utilized herein is similar to that described in U.S. Pat. No. 3,363,689. The ingredients comprise a hydraulic cement and short length fibers. The fibers are present in the composition to the extent of 0.1 to 5.0 parts by weight fibers per 100 parts by weight of dry cement.

The fibers employed in the foregoing formulations may be glass, metal, or any of the synthetic fibers, such as nylon (polyamides), Orlon (polyacrylonitrile), Dacron (polyethylene terephthalate), other acrylic fibers such as Acrilan and Zefran, modified acrylics such as Dynel (vinyl chloride-acrylonitrile copolymer) and Verel, polyolefins (polyethylene and polypropylene), polyvinyl chloride, Saran (vinyl chloride-vinylidene chloride copolymer), Kodel (a polyester based on cyclohexane dimethanol), polyfluoroolefins including Teflon (polytetrafluoroethylene), vinyl acetate-vinyl chloride copolymer, Vinyon, and the like. The glass fibers may be uncoated or coated with various silane compositions familiar to those skilled in the art.

Broadly stated, any of the natural or synthetic fibers can be used beneficially in this invention so long as they are substantially unaffected by the cement slurry, i.e., substantially insoluble in water or basic environment.

Generally, the short length fibers have a length from about 0.25 to about 5 inches, and are from about 0.001 to about 0.200 inch in diameter.

Preferred fibers include Type 39 B semi-dull Orlon acrylic staple, 2.5 inches long, and Type 54 semi-dull Dacron polyester—6 denier ½ inch long, both manufactured by E.I. du Pont de Nemours & Co. Two types of nylon fibers obtainable from DuPont and found to be particularly useful in this invention are Type 220, 3 denier, semi-dull ⅜ inch long, and Type 120, 15 denier bright, ¾ inch long. Preferred fiber glass fibers are Types 805 and 832 manufactured by Owens-Corning Fiberglass Corporation. Both of these materials contain a silane sizing and a coupling agent. The sizing on Type 805 is roughly 3.5 percent by weight of the fibers, and on Type 832, 1.58 percent by weight.

When the cement-fiber mixture is combined with water to form a slurry, the quantity of water utilized is in the range of about 22 to 80 pounds of water per 100 pounds of dry cement. When a densifier is employed, the quantity of water employed is in the range of 22 to 44 pounds per 100 pounds of dry cement; however, when a densifier is not used, the amount of water utilized is in the range of about 31 to 80 pounds of water per 100 pounds of dry cement.

By the term hydraulic cement as used herein is meant Portland, aluminous, or Pozzolan cement, lime, silica, or alumina, including cements wherein minor amounts of other oxides, e.g. iron oxide, may also be present. By definition, a hydraulic cement is any cement that hardens or sets under water and such use is observed herein. Pozzolan cements include slag cements made from slaked lime and granulated blast furnace slag. Because of its superior strength Portland cements are usually preferred among the hydraulic cements but certain advantages are often gained by the use of other hydraulic cements particularly in admixture with Portland cement. As used herein the term hydraulic cements includes minor amounts of extenders such as bentonite and/or gilsonite and includes such cements used either without any appreciable sand or aggregate material (such cement usually being referred to as neat cement) or such cements in admixture with granular filling material and/or aggregate including sand, ground limestone, pebbles, and the like.

Particularly useful hydraulic cements are those designated by the American Petroleum Institute as Classes A through H. (See API RP 10B, "Recommended Practice For Testing Oil Well Cements and Cement Addition.")

As previously mentioned, a densifier can be utilized in the fiber-containing cement composition of this invention. A densifier is an additive which enables the use of decreased quantities of water to form the slurry. As the term "densifier" implies, the density of a cement slurry is increased when, to a given amount of dry cement, a reduced quantity of water can be used to produce the slurry. By using reduced quantities of water, the strength of the hardened cement is increased.

A particularly preferred densifier for use in the fiber-containing cement composition utilized herein is that additive which is described in U.S. Pat. No. 3,359,225. The additive of U.S. Pat. No. 3,359,225 comprises polyvinylpyrrolidone having an average molecular weight of the order of magnitude of 40,000 combined with the sodium salt of naphthalene sulfonate condensed with formaldehyde and having an average molecular weight of at least 1500, or of the magnitude of 1500. The polyvinylpyrrolidone is present in the range of about 0.5 to 10 parts by weight per 100 parts by weight of the additive, the balance of the additive being essentially the sodium salt of naphthalene sulfonate condensed with formaldehyde.

The additive materials are merely mixed together and then added to the dry cement for thorough admixture therewith before incorporation into a cement mixture or slurry.

It is a basic rule of cement technology that greater compressive strengths are obtained when reduced quantities of water are utilized; thus greater compressive strengths in the hardened cement are obtained, and very sizable reduction in the initial water content of the slurry can be made by using a suitable densifier.

Other densifiers useful herein include aliphatic mono, di, and tricarboxylic acids, salts of sulfonic acids, lignin sulfonic acids, and mono, di, and polysaccharides.

The quantity of densifier utilized herein is in the range of about 0.1 to 3.0, preferably 0.3 to 1.5, parts by weight densifier per 100 parts by weight of dry cement.

While there is no critical order of mixing of cement, fibers, densifier, and water, it is preferable to combine the dry cement with the densifier and to thereafter combine the cement-densifier mix with fibers as required and thereafter to mix the cement-densifier-fibers mixture with water to thereby produce the slurry.

The cement composition useful herein, in addition to the densifier, may also contain other additives known in the cementing art, as conditions may require.

In a particularly preferred embodiment, the cement composition useful herein is comprised of API Class A Cement, 0.133 pounds fiber per 100 pounds of dry cement, 0.425 pounds of the preferred densifier per 100 pounds of dry cement, and 2.13 pounds calcium chloride per 100 pounds of dry cement. Water, in the range of about 22 to 44 pounds per 100 pounds of dry cement, is added to form a slurry. The fibers in the above described composition are 1-inch, 15-denier nylon. It is noted, however, that the process of this invention can be carried out with satisfactory results wherein the cement composition consists only of cement and fibers.

Having described our invention, what is claimed is:

1. A process for forming a cementitious lining on a hole wall comprising:
preparing a slurried cement composition, introducing into and filling the total volume of at least a portion of a hole and any cavities contiguous thereto with said slurried cement composition,
allowing the passage of a sufficient time period for said slurried cement composition to harden in said portion, and, thereafter,
excavating the resulting hardened cement composition from said portion until there remains therein a desired thickness of said hardened cement composition to thus form said lining;
wherein said slurried cement composition consists essentially of a hydraulic cement in admixture with about 0.1 to about 5.0 parts by weight fibers per 100 parts by weight of hydraulic cement and about 22 to about 80 parts by weight water per 100 parts by weight of hydraulic cement, said fibers being substantially unaffected by said cement and substantially insoluble in water and basic environments and being about 0.25 to about 5 inches in length.

2. The process of claim 1 wherein said hole is the bore hole of a well.

3. The process of claim 1 wherein said hole is a mine shaft.

4. The process of claim 1 wherein the diameter of said hole ranges up to about 40 feet.

5. The process of claim 1 wherein said time period is in the range of 18 to 24 hours.

6. The process of claim 1 wherein said portion of said hole is defined by earthen material subject to sloughing and cave-in.

7. The process of claim 1 wherein said portion of said hole is defined by fluid-containing earthen material.

8. The process of claim 7 wherein said fluid is comprised of hydrocarbons, water and mixtures thereof.

9. The process of claim 1 wherein said cement composition further contains of a densifier.

10. A formation stabilization process comprising successive treatments according to the process of claim 1 on successive portions of said hole.

* * * * *